United States Patent
Speetzen et al.

(10) Patent No.: US 7,272,486 B2
(45) Date of Patent: Sep. 18, 2007

(54) METHOD OF CONTROLLING AN INTERNAL COMBUSTION ENGINE WITH A COMMON RAIL FUEL INJECTION SYSTEM

(75) Inventors: Ralf Speetzen, Friedrichshafen (DE); Günther Schmidt, Friedrichshafen (DE); Albert Kloos, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/378,808

(22) Filed: Mar. 20, 2006

(65) Prior Publication Data

US 2006/0157035 A1  Jul. 20, 2006

Related U.S. Application Data

(63) Continuation-in-part of application No. PCT/EP2004/010547, filed on Sep. 21, 2004.

(30) Foreign Application Priority Data

Sep. 24, 2003 (DE) ............................ 103 44 181

(51) Int. Cl.
*F02M 65/00* (2006.01)
*F02M 57/02* (2006.01)
*G01M 15/00* (2006.01)

(52) U.S. Cl. ............... 701/105; 123/446; 73/119 A
(58) Field of Classification Search ........ 701/102–105, 701/112; 73/119 A; 123/299, 674
See application file for complete search history.

(56) References Cited

U.S. PATENT DOCUMENTS

| | | | | |
|---|---|---|---|---|
| 4,777,921 A * | 10/1988 | Miyaki et al. | ............... | 123/456 |
| 6,722,345 B2 * | 4/2004 | Saeki et al. | ................. | 123/435 |
| 6,755,176 B2 * | 6/2004 | Takeuchi et al. | ............ | 123/299 |

* cited by examiner

*Primary Examiner*—Willis R. Wolfe
*Assistant Examiner*—Johnny H. Hoang
(74) *Attorney, Agent, or Firm*—Klaus & Bach

(57) ABSTRACT

In a method of controlling an internal combustion engine with a common rail fuel injection system including individual fuel storage chambers for the supply of fuel to the various cylinders of the internal combustion engine, a fuel pressure (pE(i)) is determined during a measuring interval (MESS) and is stored, the existence of a significant change in the fuel pressure is determined as an injection begin (SB=f(pE(i), Phi)) or an injection end (SE=f(pE(i)), Phi), a virtual injection begin is calculated by way of a mathematical function (FKT) depending on the injection end (SE), and the virtual injection begin (SBv) is used as the actual injection begin (SB) for the subsequent control of the internal combustion engine.

9 Claims, 3 Drawing Sheets

METHOD OF CONTROLLING AN INTERNAL COMBUSTION ENGINE WITH A COMMON RAIL FUEL INJECTION SYSTEM

This is a Continuation-In-Part Application of International Application PCT/EP2004/010547 filed Sep. 21, 2004 and claiming the priority of German application 103 44 181.6 filed Sep. 24, 2003.

BACKGROUND OF THE INVENTION

The invention relates to a method of controlling an internal combustion engine with a common rail fuel injection system including for the cylinders individual storage chambers, wherein, during a measuring interval defined particularly by crankshaft angles, a fuel pressure is determined and stored and any significant change of the fuel pressure in a storage chamber is interpreted as the beginning or the end of a fuel injection.

In an internal combustion engine, the begin and the end of the fuel injection determines to a large extend the quality of the combustion and the composition of the exhaust gases. In order to maintain the legal limit values, these two characteristic values are generally controlled by an electronic control unit. However, in practice, in connection with a common rail fuel injection system, there is the problem that there is a certain time delay between the energization of the injector, the needle stroke of the injector and the actual begin of fuel injection. The same applies correspondingly to the end of the fuel injection.

A measure for alleviating the problems resides in the detection of the armature movement that is its impact at an end position thereof. Such a solution is known for example from DE 42 37 706 A1. Another possibility for detecting the impact of an armature can be obtained by applying a measuring current to the injector winding during the armature travel phase. By the measuring current, a magnetic field is generated in the winding which changes upon armature impact. The magnetic field change results in a detectable induction voltage. Such a solution is described for example in DE 44 33 209 A1. Both measures have been found suitable in practice. However, the individual properties of the cylinders and the injectors cannot be detected with these measuring methods. A corresponding control measurement for timing the control parameters is technically complicated and is therefore not done in connection with mass-produced engines. The same is true for the direct needle stroke measurement by a travel distance sensor.

Another measure for alleviating the problem mentioned above is disclosed in DE 31 18 425 A1. In this publication, the pressure pattern in the rail is measured and the values are then filtered by a differentiation of the filtered pressure pattern. Significant changes, that is, value extremes are interpreted as injection begin and injection end. The filtering of the measured pressure pattern is absolutely necessary since spurious signals such as the injection frequency and the pumping frequency of the high pressure fuel pump affect the pressure signal. However, filtering the signal results in a certain time delay with respect to the base signal.

DE 43 44 190 A1 discloses an internal combustion engine with a common rail system wherein a separate storage chamber is provided for each injector.

It is the object of the present invention to provide a common rail fuel injection system with individual storage chambers wherein the begin of the fuel injection into the cylinders and the end of the fuel injection can be relatively accurately determined.

SUMMARY OF THE INVENTION

In a method of controlling an internal combustion engine with a common rail fuel injection system including individual fuel storage chambers for the supply of fuel to the various cylinders of the internal combustion engine, a fuel pressure (pE(i)) is determined during a measuring interval (MESS) and is stored, the existence of a significant change in the fuel pressure is determined as an injection begin (SB=f(pE(i), Phi)) or an injection end (SE=f(pE(i)), Phi), a virtual injection begin is calculated by way of a mathematical function (FKT) depending on the injection end (SE), and the virtual injection begin (SBv) is used as the actual injection begin (SB) for the subsequent control of the internal combustion engine.

From the measured and stored pressure values present in the individual storage chambers a virtual injection begin is calculated depending on the injection end by a mathematical function. The virtual injection begin is then used as the actual injection begin for the control of the internal combustion engine.

With the method according to the invention—in contrast to the state of the art—the measured raw values are only used for the mathematical determination of the beginning and the end of the fuel injection. The computation therefrom of a virtual beginning of the fuel injection and the determination of reasonability effectively prevent a misinterpretation of spurious measurement values.

With the use of the method according to the invention in connection with common rail systems with individual storage chambers for the fuel injected into the various cylinders, the fuel injection begin and the end can be determined for each individual cylinder. The method is therefore more direct and faster. As a result, target-oriented safety information is present in the engine diagnosis system. In addition, the measurement engineering expenditures encountered during the development phase of an internal combustion engine are substantially reduced.

A preferred embodiment of the invention will be described below on the basis of the accompanying drawings.

DESCRIPTION OF A PREFERRED EMBODIMENT

Figure 1:
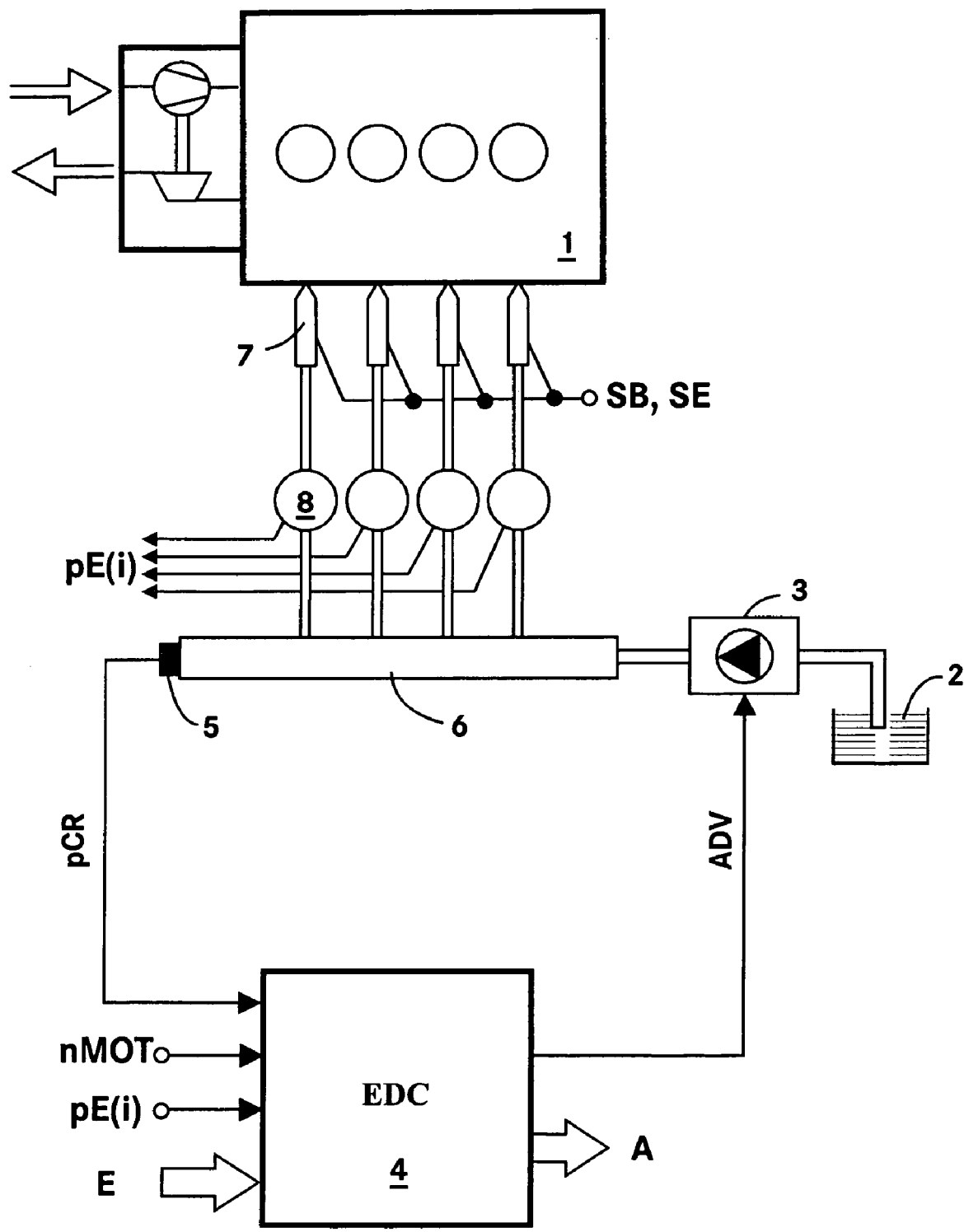
FIG. 1 shows the fuel injection control system.

FIG. 1 shows a fuel injection system of an electronically controlled internal combustion engine 1, wherein the fuel is injected into the various cylinders of the engine via a common rail fuel injection arrangement. The system comprises the following components: A pump 3 with a suction nozzle for pumping the fuel from a fuel tank 2 via a rail 6 to individual storage chambers 8 and to injectors 7 for injecting the fuel into the combustion chambers of the internal combustion engine 1. The hydraulic resistance of the individual storage chambers 8 and the fuel supply lines of the common rail system are adapted to one another. For the present invention, it is not important whether the rail 6 comprises a storage volume or is formed by a simple fuel supply line.

The internal combustion engine 1 is controlled by an electronic control unit (EDC) 4. The electronic control unit 4 includes the usual components of a microprocessor system, such as a microprocessor, I/O components, buffers and storage components (EE PROM, RAM). In the storage components, the operational data relevant to the operation of the internal combustion engine 1 are stored in the form of performance graphs/characteristic curves. By way of the performance graphs the electronic control unit 4 calculates from the input values the desired output values. FIG. 1 shows for example the following input values: a rail pressure pCR which is measured by a rail pressure sensor 5, an rpm signal nMOT of the internal combustion engine 1, pressure signals pE(i) of the individual storage chambers 8 and an input value E. As input values E, for example, the charge air pressure of a turbocharger and the combined temperature values of the coolant or the lubricant and of the fuel may be used.

In FIG. 1, as output values for the electronic control unit 4, a signal ADV for controlling a suction throttle and output value A are shown. The output value A is representative for the additional control signals for controlling the internal combustion engine 1 such as the fuel injection begin SB and the fuel injection end SE.

Figure 2:
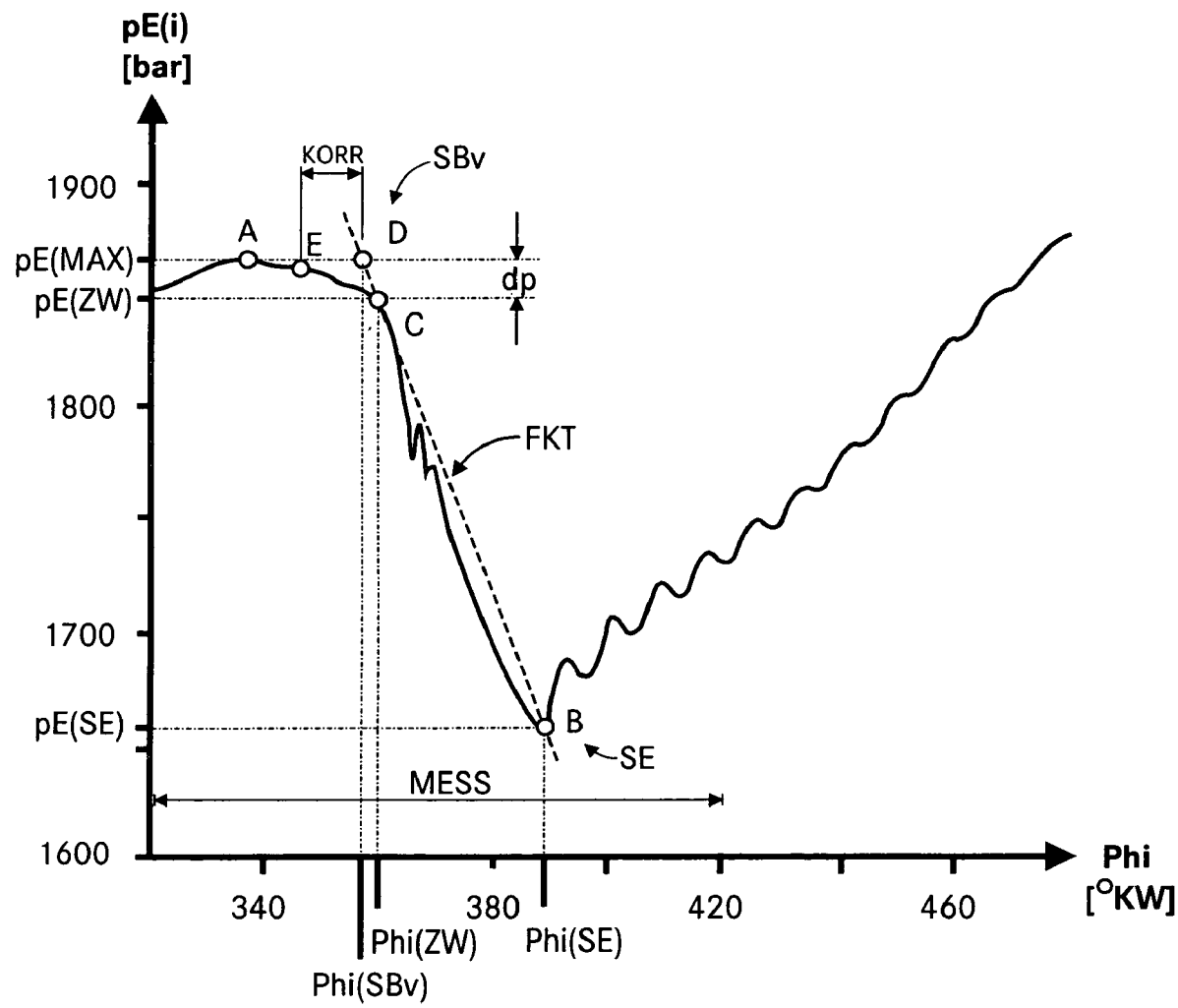
FIG. 2 shows a pressure-time diagram.

FIG. 2 shows a pressure/time diagram for a pressure pattern in an individual fuel storage chamber for the common rail injection system. On the base, the crankshaft angle Phi is plotted. On the ordinate, the fuel pressure in the individual storage chamber pE(i) is indicated. The pressure pattern in the individual storage chamber is measured over a measuring interval and is stored. The measuring interval may correspond for example to a cylinder operating cycle of the internal combustion engine that is a 720° crankshaft angle. The measuring interval MESS shown in FIG. 2 comprises for example the range of 320° to 420° crankshaft angle.

The method according to the invention is as follows:

After the pressure pattern in an individual storage chamber pE(i) has been determined during a measuring interval MESS and has been stored, the minimum value of the pressure is determined. This minimum value indicates the end of the injection SE. The injection end SE is marked in FIG. 2 by the point B. The point B is defined by the two values Phi(SE) and pE(SE). Then the maximum pressure value is selected. The maximum pressure value is disposed in the measuring interval MESS at a smaller crankshaft angle Phi than the injection end SE or, respectively, the angle Phi(SE) thereof. In FIG. 2, this angle is represented by the point A and the respective ordinate values pE(MAX). From the maximum pressure value pE(MAX) and the injection end pressure value pE(SE) an intermediate value pE(ZW) is calculated based on the following relationship:

$$pE(ZW)=pE(MAX)-dp, \text{ and}$$

$$dp=pE(MAX)-pE(SE)\cdot F1$$

wherein:
pE(ZW)=intermediate value
pE(MAX)=maximum pressure value
pE(SE)=pressure value at end of injection
F1=factor smaller than one.

Based on the measured pressure pattern pE(i), the crankshaft angle Phi(ZW) belonging to the intermediate value pE(ZW) is known. With these two values, the point C in FIG. 2 is defined. Point C is determined by the value pair 360° crankshaft angle and 1850 bar. The pressure difference dp between the maximum value pE(MAX) and the intermediate value pE(ZW) is also shown in FIG. 2. By way of the two points C, B, a mathematical function FKT is defined, here: a straight line. Of course, also other mathematical functions can be used. To this end, corresponding other intermediate values must be calculated. By way of the injection end, corresponding to point B, and the two mathematical function FKT in connection with the maximum value pE(MAX), a virtual injection begin SBv can be extrapolated. This virtual injection begin SBv corresponds in FIG. 2 to the point D. The virtual injection begin SBv can be corrected optionally by way of a constant factor KORR, point E. The factor KORR takes the effect of the hydraulic constant of the injection system on the injection begin into consideration.

Figure 3:
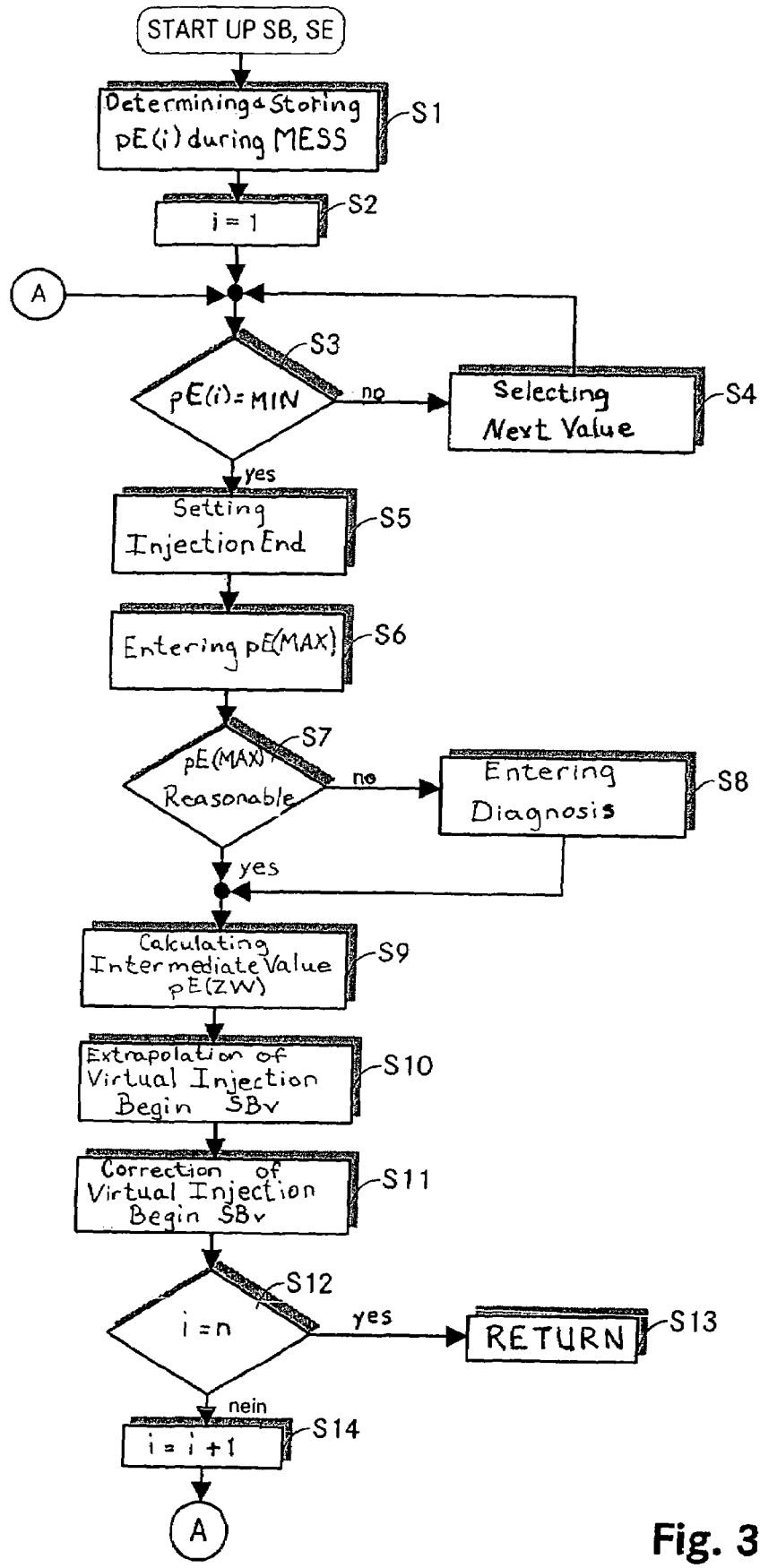
FIG. 3 shows an operational diagram for the method according to the invention.

FIG. 3 shows a program diagram for the sub-program for determining the injection begin and the injection end. At S1, the pressure values pE(i) present in the individual storage chambers 8 during the measuring interval MESS are determined and stored. At S2, the operating variable i is set to one. The operating variable i represents the number of individual storage chambers 8. At S3, it is examined whether the selected pressure value is the minimum value. If this is not the case, the next pressure value is selected in S4 and is again examined in S3.

If in S3, the minimum pressure value has been found this value together with the respective crankshaft angle value is determined to represent the injection end. Then the maximum pressure value pE(MAX) is determined. At S7, it is examined whether the measured maximum value pE(MAX) is reasonable. This can be examined by a comparison of the maximum value with a predetermined pressure value. Alternatively, the maximum value pE(MAX) is compared with a pressure value measured at a predetermined crankshaft angle. As predetermined crankshaft angle for example 320° may be used. If the examination at S& shows that the maximum value is not reasonable, at S8 a diagnosis entry is made in the electronic control unit and subsequently the program is continued at S9.

If the examination at S7 indicates that the maximum value pE(MAX) is reasonable, the intermediate value pE(ZW) is calculated at S9. At S10, a virtual injection begin SBv is extrapolated depending on the injection begin and the mathematical function determined earlier. Then the virtual injection begin SBv is corrected at S11. At S12, it is examined whether the operating variable i has reached an end value n. If this is not the case, the operating variable i is increased by 1 in S14 and the program sequence plan continued at point A. If, at S12, the examination finds that the virtual injection begin has been calculated for all the individual storage chambers that is i corresponds to n, the subprogram is terminated at S13 and the process returns to the main program. At this point, the program process is terminated.

From the description, the following advantages of the method according to the invention are apparent:

The time delay between the generation of the control signal and the actual injection begin is reduced, the calculated virtual injection begin is insensitive to interference values, whereby the control circuit for controlling the injection begin and the injection end is stabilized, a cylinder-individual diagnosis value determination and control becomes possible, the technical measuring expenditures during the development phase of an internal combustion engine are reduced.

What is claimed is:

1. A method of controlling an internal combustion engine (1) with a common rail fuel injection system including individual fuel storage chambers (8) for supplying fuel to the individual cylinders of the internal combustion engine (1), said method comprising the steps of: determining and storing a fuel pressure (pE(i), i=1, 2 . . . n) present in each of the individual fuel storage chambers (8) during a measuring interval (MESS) (crankshaft angle (Phi)), determining any significant change in the fuel pressure (pE(i)) as an injection begin (SB=f(pE(i)Phi)) or as injection end (SE=f(pE(i)), Phi)), calculating a virtual injection begin by way of a mathematical function (FKT) depending on the injection end (SE) and using the virtual injection begin (SBv) as actual injection begin (SB) for controlling the internal combustion engine (SB=SB$_V$).

2. A method according to claim 1, wherein the virtual injection begin (SBv) is calculated by selecting a maximum pressure value (pE(MAX)) disposed in the measuring interval (MESS) ahead of the injection end, calculating an intermediate pressure value (pE(ZW)) depending on the maximum pressure value (pE(MAX) and the injection end pressure (pE(SE)), wherein the intermediate pressure value (pE(ZW)) and the injection end (SE) define a mathematical function (FKT) and extrapolating the crankshaft angle (PhiSBv) of the virtual injection begin (SBv) depending on the maximum pressure value (PE(MAX)) by way of the mathematical function (FKT).

3. A method according to claim 2, wherein the intermediate pressure value (pE(ZW)) is calculated in accordance with the following equations:

$$P(E(ZW)=pE(MAX)-dp$$

$$dp=(pE(MAX)-pE(SE)\cdot F1$$

wherein
  pE(ZW) is the intermediate pressure value,
  pE(MAX) is the maximum pressure value
  pE(SE) is the pressure value at the end of an injection,
  F1 is a factor smaller than 1.

4. A method according to claim 2, wherein the virtual injection begin (SBv) is corrected by a correction factor (KORR).

5. A method according to claim 2, wherein the maximum pressure value (pE(MAX) is examined for reasonability by comparison with a predetermined pressure.

6. A method according to claim 2, wherein the maximum pressure value (pE(MAX)) is examined for reasonability by comparison with a pressure value measured at a certain crank angle.

7. A method according to claim 6, wherein, upon determination of unreasonability, a diagnosis entry is made in a memory of an electronic control device.

8. A method according to claim 1, wherein the measuring interval extends over a working cycle of the internal combustion engine (1), that is, a selectable crankshaft angle range.

9. A method according to claim 8, wherein the crankshaft angle range is 320 to 420°.

* * * * *